United States Patent
Hirata (10) Patent No.: US 8,100,153 B2
(45) Date of Patent: Jan. 24, 2012

(54) FLOAT VALVE APPARATUS

(75) Inventor: Nobuhiro Hirata, Kanagawa (JP)

(73) Assignee: Piolax Inc., Kanagawa (JP)

( * ) Notice: Subject to any disclaimer, the term of this patent is extended or adjusted under 35 U.S.C. 154(b) by 279 days.

(21) Appl. No.: 12/453,734

(22) Filed: May 20, 2009

(65) Prior Publication Data

US 2009/0288735 A1 Nov. 26, 2009

(30) Foreign Application Priority Data

May 21, 2008 (JP) .............................. P2008-133449
Jul. 4, 2008 (JP) .............................. P2008-175732

(51) Int. Cl.
*B65B 1/30* (2006.01)

(52) U.S. Cl. ........... 141/198; 141/95; 137/202; 137/587

(58) Field of Classification Search .................. 137/202, 137/587; 141/198, 95
See application file for complete search history.

(56) References Cited

U.S. PATENT DOCUMENTS

| | | | | |
|---|---|---|---|---|
| 5,409,030 A * | 4/1995 | Sung | ............................. | 137/39 |
| 5,832,950 A * | 11/1998 | Shimada et al. | ............. | 137/202 |
| 6,035,884 A * | 3/2000 | King et al. | ..................... | 137/202 |
| 6,085,771 A * | 7/2000 | Benjey et al. | .............. | 137/15.26 |
| 7,147,017 B2 * | 12/2006 | Leonhardt | ..................... | 141/198 |
| 2004/0007262 A1* | 1/2004 | Hattori | ........................... | 137/202 |
| 2004/0011401 A1* | 1/2004 | Kato | ............................ | 137/202 |
| 2006/0213555 A1* | 9/2006 | Miura et al. | .................. | 137/202 |
| 2007/0125428 A1* | 6/2007 | Furuya | ........................... | 137/202 |
| 2010/0224262 A1* | 9/2010 | Arnalsteen et al. | ............. | 137/43 |

FOREIGN PATENT DOCUMENTS

| | | |
|---|---|---|
| JP | 6-40552 | 5/1994 |
| JP | 07-035255 | 2/1995 |

* cited by examiner

*Primary Examiner* — Dinh Nguyen
*Assistant Examiner* — Jennifer Gordon
(74) *Attorney, Agent, or Firm* — McGinn IP Law Group, PLLC (57) ABSTRACT

According to an aspect of the present invention, there is provided a float valve apparatus including: a housing including: a partition wall dividing an internal space into lower and upper spaces and having an opening therein; a ventilation pipe communicating the upper space with an outside; a valve seat formed at the opening; and a communication hole communicating the lower space with the outside; a float that is valve vertically slidably movable in the lower space and that upwardly floats in accordance with liquid flowing thereinto to open and close the opening; an upward urging spring urging the float valve from the housing toward the opening; and a support spring disposed inside the upward urging spring to support the float valve to not contact with a bottom surface of the housing.

12 Claims, 8 Drawing Sheets

Fig. 8

FLOAT VALVE APPARATUS

CROSS-REFERENCE TO RELATED APPLICATIONS

This application claims priority from Japanese Patent Application No. 2008-133449 filed on May 21, 2008, and from Japanese Patent Application No. 2008-175732 filed on Jul. 4, 2008, the entire contents of which are incorporated herein by reference.

BACKGROUND OF THE INVENTION

1. Field of the Invention

An aspect of the present invention relates to a float valve apparatus suitable for use as a fuel fill-up control valve, a cut valve or a similar valve to be mounted on, for example, the fuel tank of a car.

2. Description of the Related Art

On the fuel tank of a car, there is mounted a fuel fill-up control valve which, when fuel is supplied up to the fill-up position of the fuel tank, closes the opening of the fuel tank communicating with the outside to stop the supply of the fuel.

Also, there is provided a cut valve which not only releases fuel steam to a canister but also, when the car jolts heavily while running or the car rolls over, closes an opening communicating with the canister to prevent the fuel from leaking to the outside.

As such fuel fill-up control valve and cut valve, there is employed a float valve apparatus structured such that it can be moved upward according to a rise in the liquid surface of the fuel to close the opening of the valve apparatus.

However, in such float valve apparatus, when the car runs along a rough road, the float valve can collide with the bottom surface of a housing to generate a strange sound.

JP-UM-H06-040552-A discloses a fuel leakage preventive valve structured such that a float valve disposed within a room formed in the housing can be moved up and down. Specifically, in the disclosed fuel leakage preventive valve, a separately-formed elastic buffer is interposed between the lower surface of the float valve and the receiving surface of the housing disposed opposed to the float valve lower surface. Since the lower surface of the float valve is elastically supported by the elastic buffer from the opposed receiving surface of the housing, even when the float valve is going to move up and down within the room due to the running vibration of the car or the like, the strong collision therebetween are buffered, and the generation of the loud strange sound is effectively reduced.

JP-H07-035255-A discloses a fuel cut valve including: a valve housing mounted on the upper surface portion of a fuel tank; a valve port formed within the valve housing and communicating with the ventilation line for fuel steam through a downstream side passage projecting outwardly of the housing; and a float valve for detecting the liquid surface level inside the fuel tank to open or close the valve port. In this fuel cut valve, a slit is formed in the bottom portion of the valve housing, whereby a cantilever valve body support portion is formed as an integral portion.

However, in JP-UM-H06-040552-A, since the elastic buffer for supporting the lower surface of the float valve is disposed outside a spring for urging the float valve upwardly, the outside diameter of the elastic buffer is large, which makes it difficult to set the load, free length and the like of the elastic buffer with high accuracy. Also, since, when the float valve is moved down in an inclined manner, the load concentrates on the local portion of the large outside diameter elastic buffer, there is raised a possibility that the collision of the float valve with the housing cannot be controlled sufficiently.

In JP-H07-035255-A, when the valve housing is formed of hard resin from the viewpoint of heat resistance, the elasticity of the cantilever valve body support portion is poor, which lowers the hitting sound reduction effect when the valve housing is collided with the float valve. Also, when the cantilever valve body support portion is formed thin in order to enhance the elasticity thereof, it is easy to break.

SUMMARY OF THE INVENTION

According to an aspect of the present invention, there is provided a float valve apparatus including: a housing including: a partition wall that divides an internal space of the housing into a lower space and an upper space and that has an opening formed therein; a ventilation pipe that is formed to communicate the upper space with an outside; a valve seat that is formed at the opening of the partition wall; and a communication hole that is formed to communicate the lower space with the outside; a float valve that is disposed to be slidably movable in a vertical direction in the lower space and that is configured to be upwardly floated by liquid flowing into the lower space through the communication hole so as to open and close the opening; an upward urging spring that is disposed between a lower surface of the float valve and a bottom surface of the housing to urge the float valve toward the opening; and a support spring that is disposed inside the upward urging spring to support the float valve so as to be prevented from contacting with the bottom surface of the housing in a state where the float valve is moved to a lowermost position.

According to such configuration, for example, when liquid such as the fuel of a car flows into the housing and the liquid surface of the liquid rises up to a given height or more, the float valve is moved upward to close the opening formed in the partition wall, thereby being able to prevent the liquid from flowing into the upper space through the opening. For example, as applied to the fill-up control valve of the fuel tank of the car or to the cut-off valve thereof, the fill-up control in the fuel supply operation can be carried out and the leakage of the fuel to the outside can be prevented.

Even when the liquid surface of the fuel varies suddenly due to the jolting movement of a car while it is running and the float valve is thereby caused to move down suddenly, the float valve is resiliently received by the support spring and thus the lower surface of the float valve is prevented from colliding with the bottom surface of the housing, which can reduce the hitting sounds of the float valve greatly.

Since the support spring is disposed inside the upward urging spring and the outside diameter of the support spring is thereby set smaller than the outside diameter of the upward urging spring, the load of the spring, the free length of the spring and the like can be set with high accuracy. As a result of this, a proper clearance can be set between the lower surface of the float valve and the bottom surface of the housing, thereby being able to reduce the hitting sounds effectively.

Since the support spring is disposed inside the upward urging spring, even when the float valve moves down in an inclined manner, the float valve is supported stably, which can attain the smooth lowering operation of the float valve.

According to another aspect of the present invention, there is provided the float valve apparatus, wherein the float valve includes: a support spring storage recess that is formed in a central portion of the lower surface of the float valve to store the support spring therein and to have a depth larger than a free length of the support spring; an upward urging spring storage recess that is formed at an outer periphery of the support spring storage recess to store the upward urging spring; and a tubular partition wall that is formed to partition the support spring storage recess and the upward urging spring storage recess, wherein the housing includes a projection that is formed to protrude from a central portion of the bottom surface of the housing and that supports a lower end portion of the support spring, and wherein the support spring is inserted into the support spring storage recess so that the lower end portion thereof is supported by the projection.

According to such configuration, since the support spring and upward urging spring are respectively stored into their associated support spring storage recess and upward urging spring storage recess which are formed with the partition wall between them, the two springs can be prevented from being twined with each other or from interfering with each other when they are assembled or used. This can enhance the assembling operation and also allows the springs to fulfill their spring operations in use.

The support spring storage recess is formed to have a depth larger than the free length of the support spring, and the support spring is inserted into the support spring storage recess so that the lower end portion of the support spring is supported by the projection provided on the bottom surface of the housing. This can surely prevent mutual contact between the support spring and upward urging spring and also can prevent the support spring from flying out of its position to thereby be able to hold it at its given position surely.

According to still another aspect of the prevent invention, there is provided the float valve apparatus, wherein the projection includes: a support portion that is formed at a proximal side thereof to support the lower end portion of the support spring and that is to slidingly contact with an inner periphery of the support spring storage recess when the float valve moves vertically; and an insertion portion that upwardly extends from the support portion to have a diameter reduced with respect to the support portion and that is to be inserted into an inner periphery of the support spring.

According to such configuration, while the support portion of the projection is supporting the lower end of the support spring at a high position, the support spring can be supported stably by the insertion portion which is inserted into the inner periphery of the support spring. Since, when the float valve moves up and down, the support portion of the projection is slidingly contacted with the inner periphery of the support spring storage recess, the float valve can be prevented from inclining or de-centering, thereby being able to move the float valve up and down smoothly.

According to still another aspect of the prevent invention, there is provided the float valve apparatus, wherein at least part of the projection is formed of a plurality of ribs radially projecting from a center axis thereof.

According to such configuration, for example, since at least one of the support portion and insertion portion constituting the projection is made of plural ribs respectively projected radially, even when the fuel flows into the inner periphery of the tubular portion of the projection, the fuel can be discharged smoothly therefrom, which can reduce an influence on the rising and falling operation of the float valve. Also, when the support portion is made of radially extending plural ribs, the contact area of the tubular portion with the inner periphery of the peripheral wall is reduced, thereby reducing the sliding resistance of the float valve in the rising and falling operation thereof.

According to still another aspect of the prevent invention, there is provided the float valve apparatus, wherein the float valve includes a support spring storage recess that is formed in a central portion of the lower surface of the float valve to store the support spring therein, and wherein an upper end portion of the support spring is fixed to an inner end portion of the support spring storage recess.

According to such configuration, since the support spring is inserted into the support spring storage recess formed in the central portion of the lower surface of the float valve and the upper end portion of the support spring is fixed to the inner end portion of the support spring storage recess, the float valve and support spring are combined with each other. As a result of this, the support spring is allowed to rise and fall together with the float valve, which prevents that, when the float valve rises and falls, the support spring slidingly contacts with the inner periphery of the support spring storage recess and thus can provide resistance against the rising and falling operation of the float valve.

According to still another aspect of the prevent invention, there is provided the float valve apparatus, wherein the support spring storage recess is formed to have a depth larger than a free length of the support spring, wherein the housing includes a projection that is formed to protrude from a central portion of the bottom surface of the housing, and wherein the projection slidingly contacts with an inner periphery of the support spring storage recess when the float valve moves vertically and contacts with a lower end portion of the support spring when the float valve moves downward.

According to such configuration, the support spring is inserted into the support spring storage recess formed to have a depth larger than the free length of the support spring and also the projection provided on the bottom surface of the housing is inserted into the support spring storage recess. This can surely prevent mutual interference between the support spring and upward urging spring disposed outside the support spring. Since, when the float valve rises and falls, the projection is to be slidingly contacted with the inner periphery of the support spring storage recess, the rising and falling operation of the float valve is guided such that the float valve is prevented against inclination and de-centering, whereby the float valve can be moved up and down smoothly.

DETAILED DESCRIPTION OF THE EMBODIMENTS

Next, description will be given below of an embodiment of a float valve apparatus according to the invention with reference to FIGS. 1 to 5.

Figure 1:
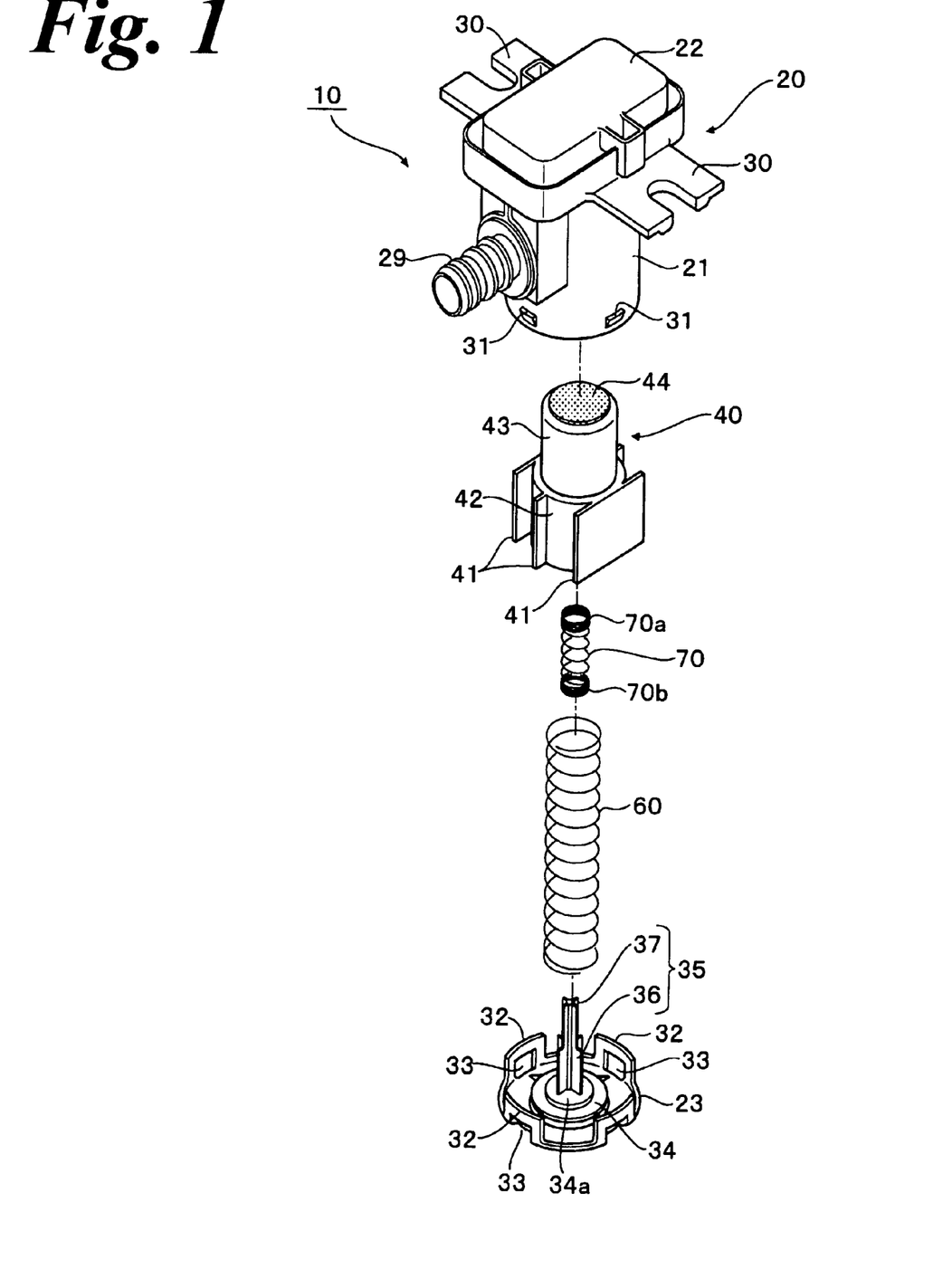
FIG. 1 is an exploded perspective view of an embodiment of a float valve apparatus according to the invention.

As shown in FIG. 1, this float valve apparatus 10 includes a housing 20, a float valve 40, an upward urging spring 60 and a support spring 70.

Figure 3:
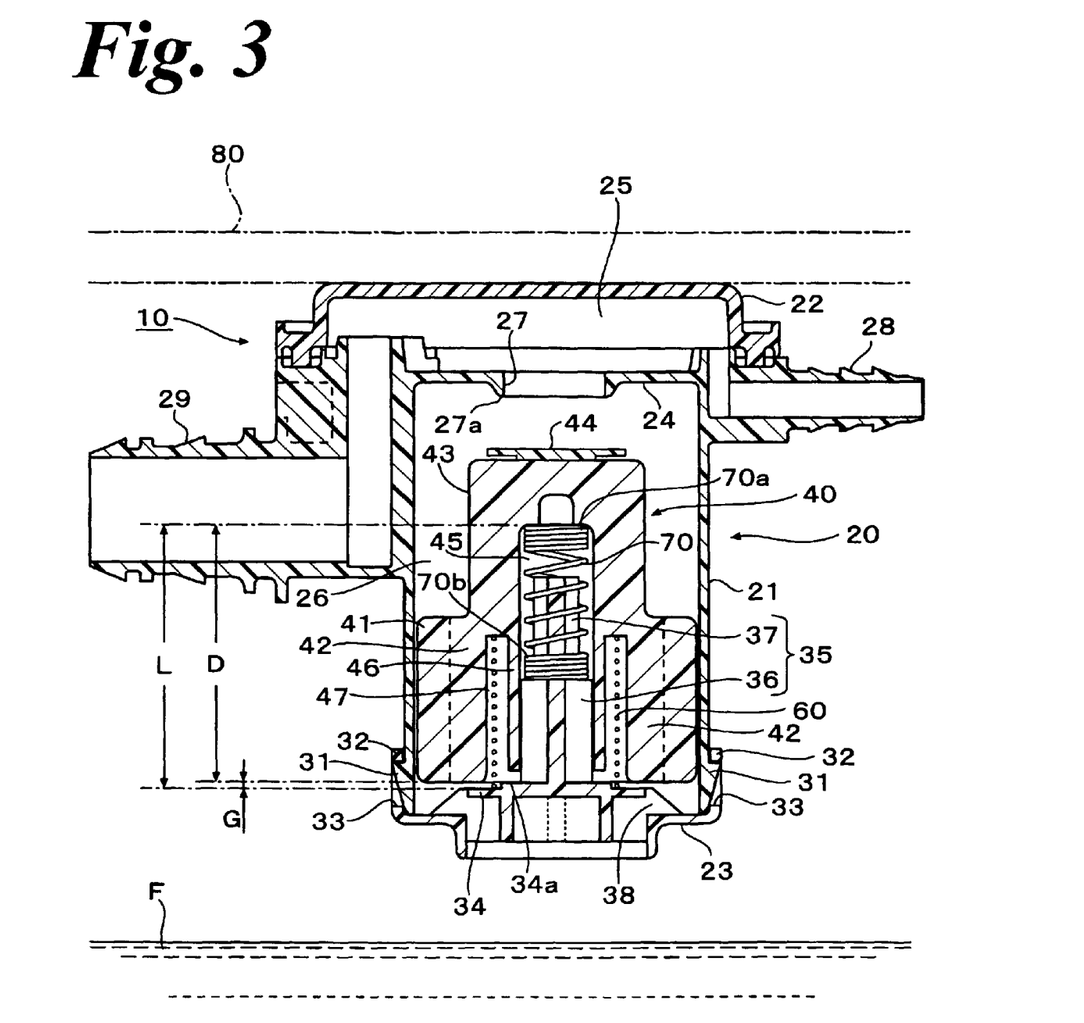
FIG. 3 is a section view of the float valve apparatus, showing a state in which the float valve apparatus is mounted on a fuel tank, and the liquid surface of fuel exists in the lower position thereof and a float valve is lowered.

Referring to FIG. 3 together with FIG. 1, the housing 20 includes a housing main body 21, an upper cap 22 and a lower cap 23. In the upper portion of the housing main body 21, a partition wall 24 is provided to divide the inside portion of the housing 20 into an upper space 25 and a lower space 26.

An opening 27 is formed in the partition wall 24, and the lower edge portion of the opening 27 forms a valve seat 27a. A connecting pipe 28 and a connecting pipe 29 (respectively functioning as ventilation pipes) are formed on the side walls of the housing main body 21. The base end sides of the connecting pipes 28 and 29 are respectively opened in the upper space 25 that is closed by the upper cap 22.

On the side wall upper portion of the housing main body 21, a pair of flanges 30 and 30 are formed to respectively extend in the opposing directions (see FIG. 1), and the float valve apparatus 10 is mounted onto the ceiling wall 80 of a fuel tank through the flanges 30. The upper cap 22 is fixed to the upper surface of the housing main body 21 by thermal welding or by similar fixing means.

Plural engaging pawls 31 are provided to project from the side wall lower portion of the housing main body 21. Correspondingly to the engaging pawls 31, tongue pieces 31 are provided on the lower cap 23 to erect therefrom; and engaging holes 33 into which the engaging pawls 31 are to be fitted are formed in the tongue pieces 32. Therefore, when the tongue pieces 32 of the lower cap 23 are aligned to the engaging pawls 31 of the housing main body 21 and the lower cap 23 is pushed into the housing main body 21 toward the lower surface thereof, the engaging pawls 31 are fitted into the engaging holes 33 of the tongue pieces 32, whereby the lower cap 23 is mounted onto the housing main body 21.

Figure 2:
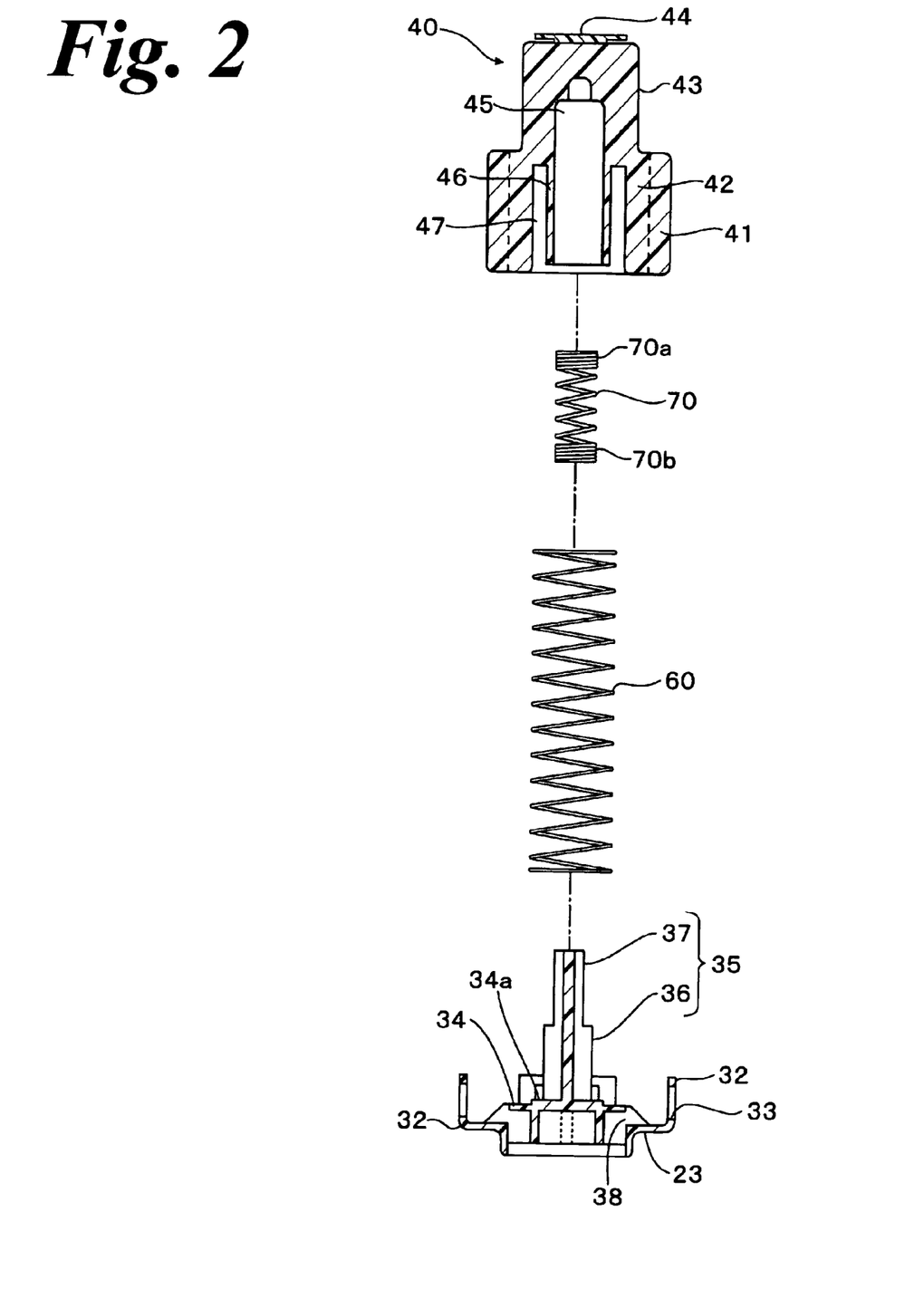
FIG. 2 is a section view of a float valve, a support spring, an upward urging spring and a lower cap respectively included in the float valve apparatus.

Referring now to FIG. 2 together with FIGS. 1 and 3, the lower cap 23 has an upward urging spring receiving base 34 at the central portion of the bottom surface thereof and a disk-shaped projecting portion 34a at the central portion of the upward urging spring receiving base 34. The upward urging spring 60 is supported so that the lower end portion thereof is contacted with the upward urging spring receiving base 34. Further, a projection 35 having the cross section of a cross-like shape is formed on the central portion of the disk-shaped projecting portion 34a to erect therefrom.

The projection 35 has a support portion 36 having a large diameter at the lower portion thereof and an insertion portion 37 having a reduced diameter at the upper portion thereof. The insertion portion 37 of the projection 35 is inserted into the inner periphery of the support spring 70, while the lower end portion 70b of the support spring 70 is contacted with and supported by the upper end portion of the support portion 36.

Referring again to FIG. 1, the float valve 40 includes plural guide fins 41 in the lower portion thereof. The guide fins 41 are formed to have size matching to the inner periphery of the lower space 26 of the housing 20. The float valve 40 includes a base portion 42 having a relatively large diameter and a head portion 43 having a slightly reduced diameter. The guide fins 41 are extended outwardly from the base portion 42 respectively.

On the upper end face of the head portion 43, a valve member 44 made of an elastic seal member is formed. As shown in FIGS. 2 and 3, a support spring storage recess 45 is formed on central portion of the lower surface of the float valve 40. On the outer periphery of the support spring storage recess 45, a tubular-shaped partition wall 46 is formed, and in the outer periphery of the partition wall 46, an upward urging spring storage recess 47 is formed. The upward urging spring 60 is structured such that the upper end portion thereof is inserted into the upward urging spring storage recess 47 and the lower end portion thereof is contacted with and supported on the upper surface of the upward urging spring receiving base 34.

The support spring 70 is installed in the following manner: the insertion portion 37 of the projection 35 is inserted into the inner periphery of the support spring 70; the lower end portion 70b thereof is supported on and by the upper end portion of the support portion 36; and the upper end portion 70a thereof is inserted into the support spring storage recess 45. The spring load of the support spring 70 is set to be three to forty times as large as the weight of the float valve 40.

As shown in FIG. 3, when the float valve 40 is lowered, the length L from the upward urging spring receive base 34 to the upper end portion 70a of the support spring 70 is set to be larger than the depth D from the lower surface of the float valve 40 to the inner end portion (the surface with which the support spring 70 contacts when the float valve 40 is lowered) of the support spring storage recess 45. As a result of this, when the float valve 40 is moved down to the lower-most position, the upper end portion 70a of the support spring 70 is contacted with the inner end of the support spring storage recess 45, thereby being able to form a clearance G between the lower surface of the float valve 40 and the upper surface of the upward urging spring receiving base 34.

Figure 4:
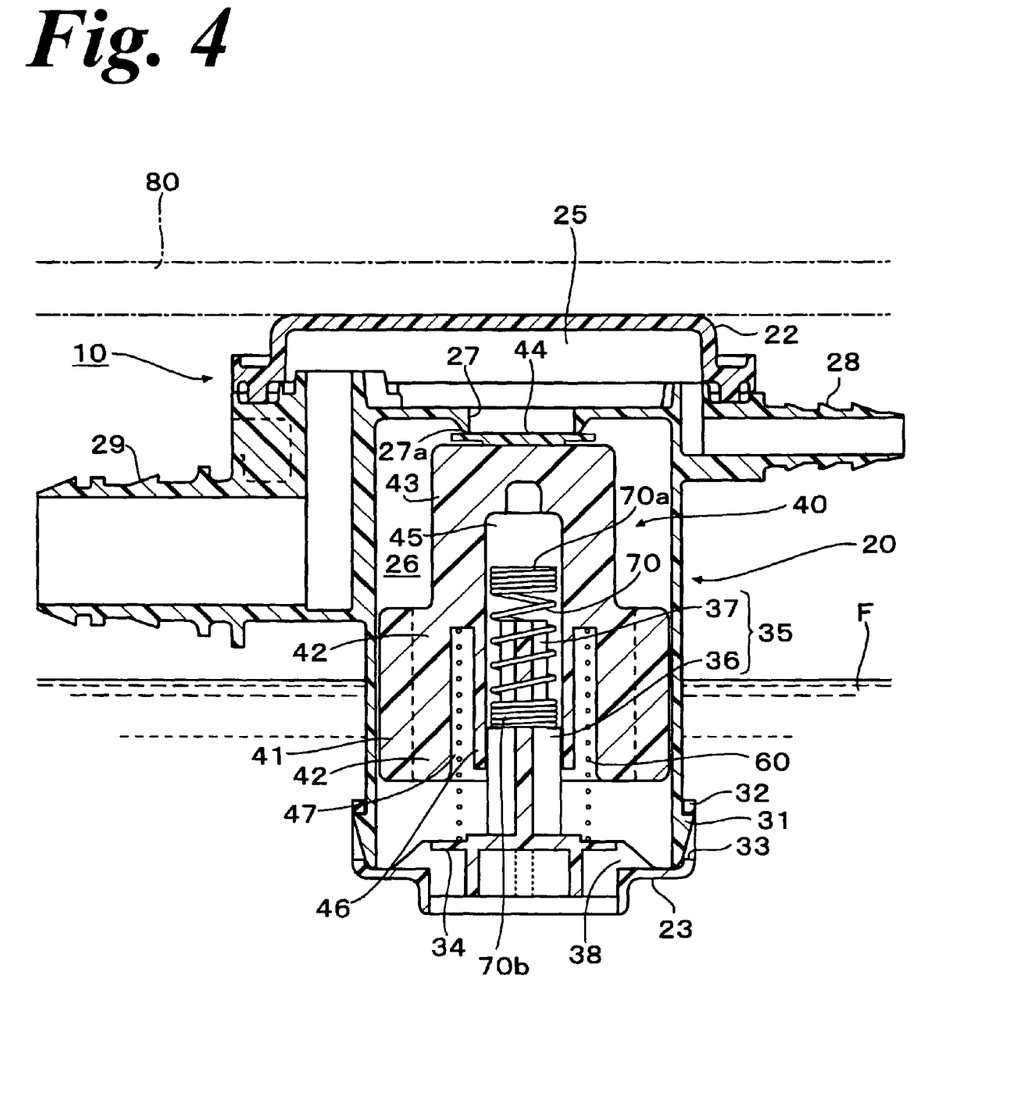
FIG. 4 is a section view of the float valve apparatus, showing a state in which the fuel liquid surface rises and the float valve closes an opening.

Since the free length of the support spring 70 is set smaller than the depth D of the support spring storage recess 45 as shown in FIG. 4, even in a state where the float valve 40 floats up to close the opening 27 by the valve member 44, the support spring 70 is prevented from being exposed from the support spring storage recess 45.

Next, description will be given below of the operation of the float valve apparatus 10.

FIGS. 3 and 4 show an example in which the float valve apparatus 10 is used as a fuel fill-up control valve for a fuel tank. As described above, the float valve apparatus 10 is mounted on the lower surface of the ceiling wall 80 of the fuel tank. Since the liquid surface of the fuel F is raised gradually as the fuel F is supplied, the air and fuel steam existing within the fuel tank must be discharged to the outside. In this case, in the float valve apparatus 10, the air and fuel steam within the fuel tank are allowed to flow into a lower space 26 within the housing 20 from plural communication holes 38 respectively formed in the lower cap 23, then flow through the opening 27 into the upper space 25, and are sent to a canister disposed in the outside of the fuel tank through a ventilation line (not shown) which is connected to the connecting pipe 29.

Therefore, the air and fuel steam of the volume corresponding to the volume of the supplied fuel are discharged to the outside, whereby the supply of the fuel is progressed. As shown in FIG. 4, when the liquid surface of the fuel F comes near to the upper limit, the fuel flows into the lower space 26 of the housing 20 from the openings of the lower cap 23, a floating force is applied to the float valve 40, and the float valve 40 is floated by the floating force and by the urging force of the support spring 70.

When the liquid surface of the fuel F reaches the upper limit, the valve member 44 of the float valve 40 is contacted with the valve seat 27a of the opening 27 to close the opening 27. As a result, the air and fuel steam within the fuel tank become unable to escape therefrom to the outside, and the internal pressure of the fuel tank is raised. Thus, the fuel supply using a fuel supply gun is automatically stopped by a known mechanism. That is, the fuel fill-up control in the fuel supply is carried out in this manner.

On the other hand, while a car is running, especially, when the car is running along a rough road, the float valve 40 may be heavily moved up and down due to the vibration of the car. According to the float valve apparatus 10, as shown in FIG. 3, when the float valve 40 moves down, the upper end portion 70a of the support spring 70 is contacted with the inner end of the support spring storage recess 45 so that the float valve 40 is supported to provide the clearance G between the lower surface of the float valve 40 and the upper surface of the upward urging spring receive base 34. As a result, the lower end portion of the float valve 40 is prevented from colliding with the lower cap 23, and the support spring 70 absorbs the vertical heavy movement of the float valve 40, thereby preventing the generation of a big striking sound.

Since the support spring 70 is situated inside the upward urging spring 60 and is formed to have a small spring diameter, the spring load, free length and the like thereof can be set with high accuracy. Further, even when the float valve 40 is moved down in an inclined state due to the inclination of the car, the movement of the float valve 40 is guided by the support portion 36 of the projection 35 inserted into the support spring storage recess 45, whereby the float valve 40 is stably supported by the support spring 70. As a result, the lower surface of the float valve 40 is surely prevented from colliding with the lower cap 23.

The depth D of the support spring storage recess 45 is set longer than the free length of the support spring 70. And, the state in which the support spring 70 is stored in the support spring storage recess 45 is maintained even when the float valve 40 is floated to close the opening 27 as shown in FIG. 4. As a result, it is prevented that the support spring 70 and upward urging spring 60 is twined together to lead to the poor operation of the float valve.

Figure 5:
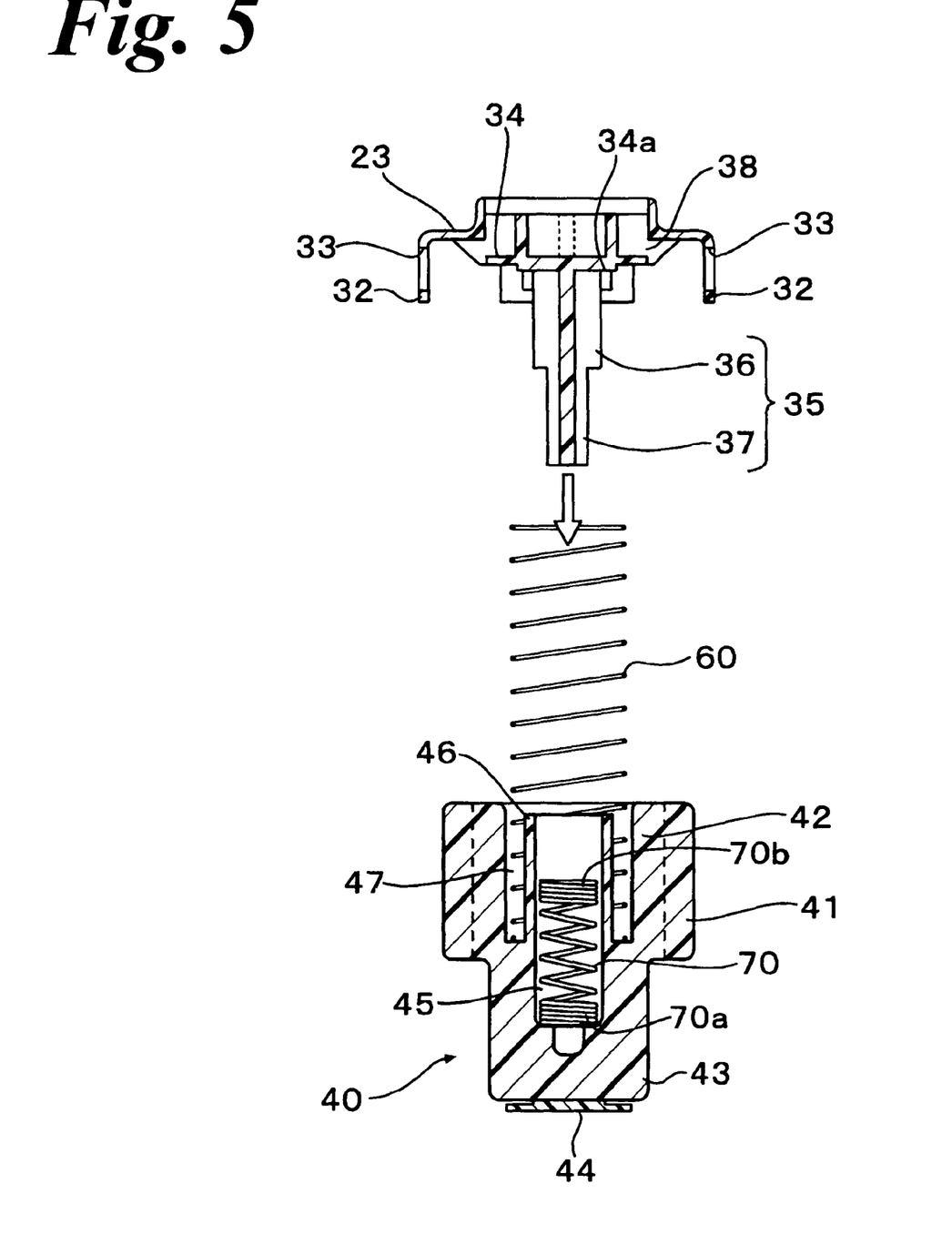
FIG. 5 is an explanatory view of the assembling procedure for the float valve apparatus.

When assembling the float valve apparatus 10, as shown in FIG. 5, the float valve 40 is set with the opening of the support spring storage recess 45 facing upwardly. In this state, after the support spring 70 is inserted into the support spring storage recess 45, the upward urging spring 60 is inserted into the upward urging spring storage recess 47. In this state, the float valve 40 is inserted into the housing main body 21 (not shown in FIG. 5), and the lower cap 23 is pushed in downwardly as shown by an arrow mark in FIG. 5, and the float valve 40 is assembled to the housing main body 21. Since the support spring 70 and upward urging spring 60 are respectively stored separately within the support spring storage recess 45 and upward urging spring storage recess 47 which are partitioned by the partition wall 46, it is possible to prevent the support spring 70 and upward urging storage recess 60 from twining with each other and thus prevent such mutual twined state of them from interfering with the assembling operation of the float valve apparatus 10.

According to the present embodiment, since the projection 35 is made of ribs to have a cross-shaped cross section, the air, fuel steam and the fuel are allowed to flow into and out of the support spring storage recess 45 through clearances between the respective ribs. This can reduce the sliding resistance of the float valve 40 when the float valve 40 moves up and down.

When a clearance is formed between the upper end portion 70a of the support spring 70 and the inner end of the support spring storage recess 45 in a state shown in FIG. 4 where the float valve 40 is moved up, the support spring 70 may be caused to shake within the support spring storage recess 45. Since the support spring 70 is itself elastic and also is small in mass, the shaking sounds of the support spring 70 are as low as can be neglected. In order to reduce the shaking sounds further, the lower end portion 70b of the support spring 70 may also be fixed to the upper surface of the support portion 36 of the projection 35.

Figure 6:
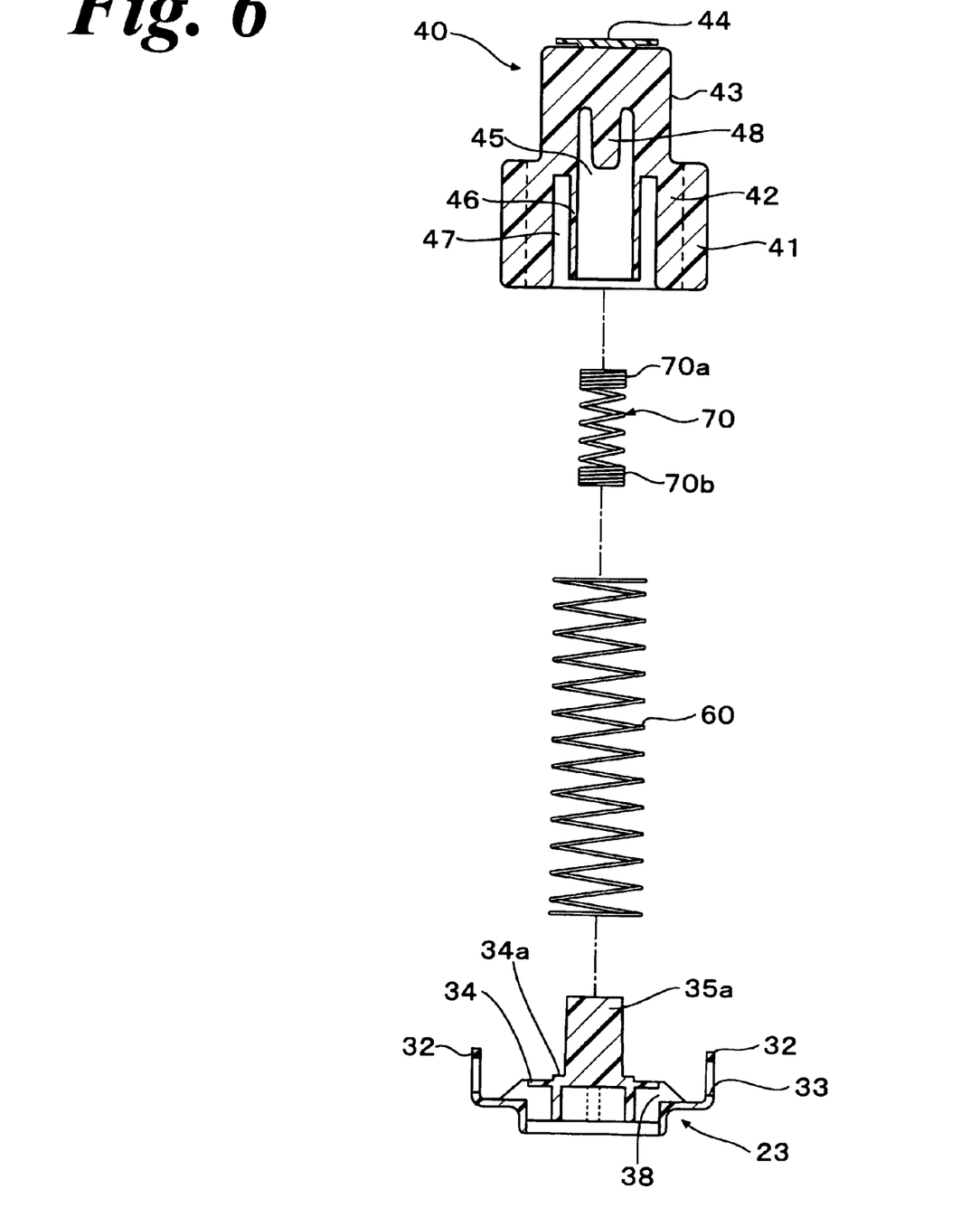
FIG. 6 is a section view of a float valve, a support spring, an upward urging spring and a lower cap respectively included in a second embodiment of a float valve apparatus according to the invention.
Figure 7:
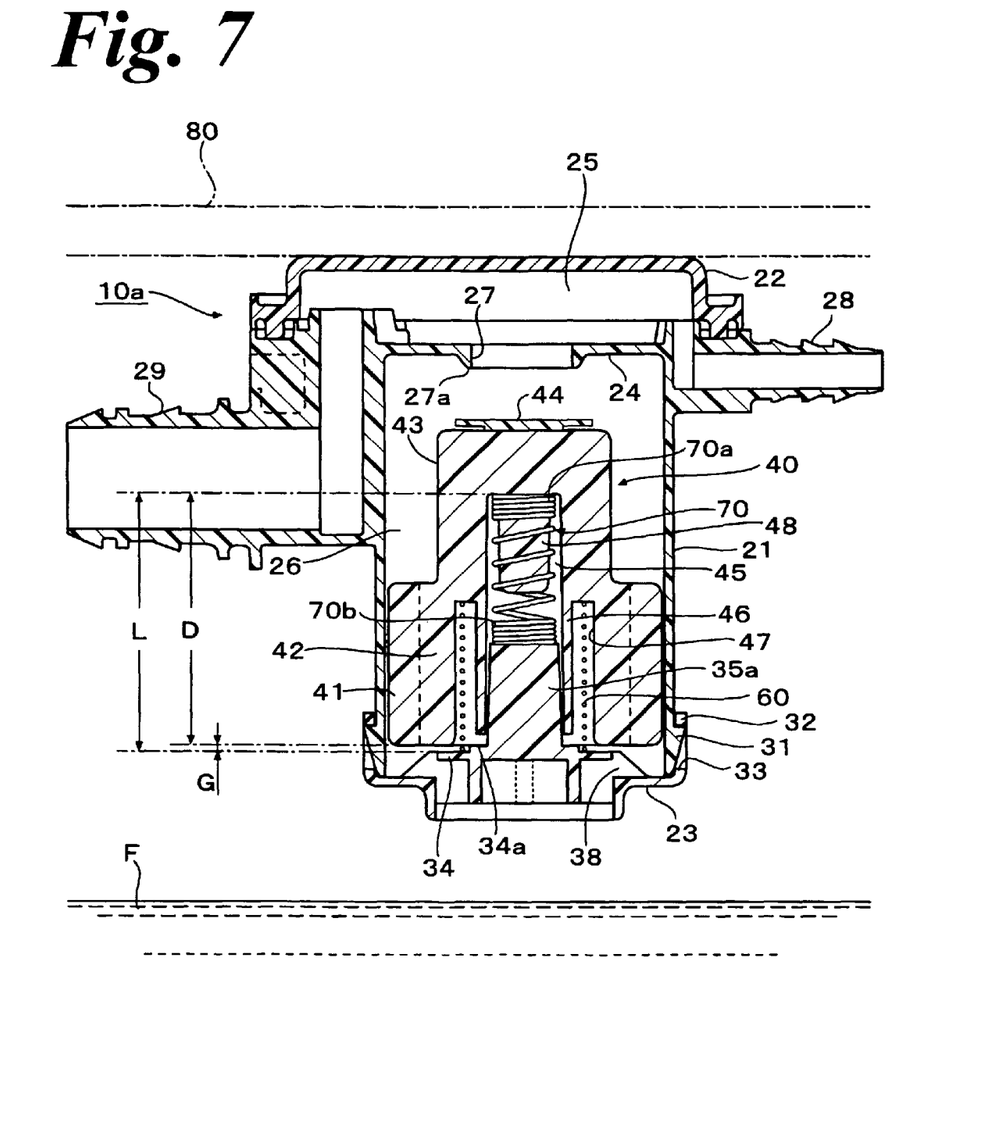
FIG. 7 is a section view of the float valve apparatus according to the second embodiment, showing a state in which the float valve apparatus is mounted on a fuel tank, and the liquid surface of fuel exists in the lower position thereof and a float valve is lowered.
Figure 8:
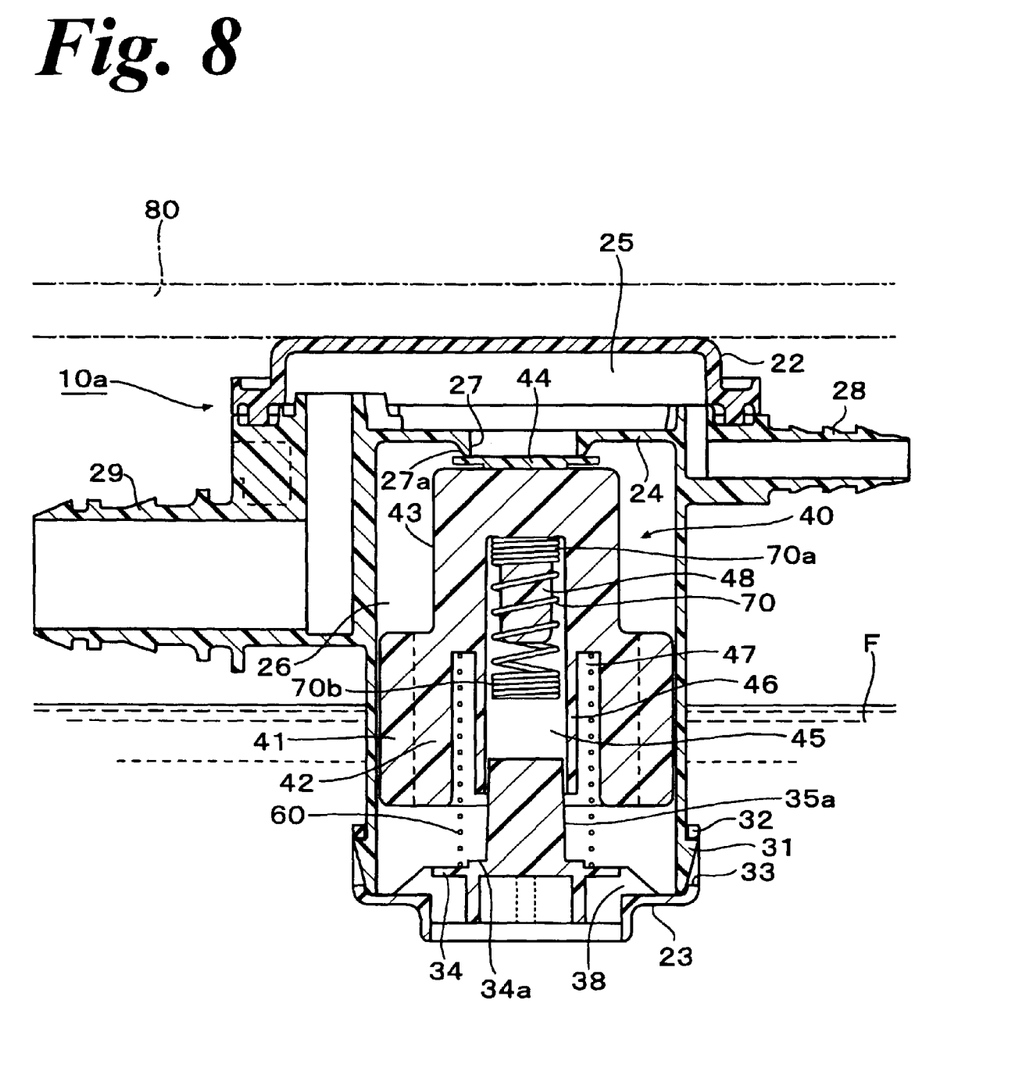
FIG. 8 is a section view of the float valve apparatus according to the second embodiment, showing a state in which the fuel liquid surface rises and the float valve closes an opening.

FIGS. 6 to 8 respectively show another embodiment of a float valve apparatus according to the invention. The substantially same parts of the present embodiment as the above-mentioned embodiment are given the same designations and thus the description thereof is omitted here.

Referring now to the structure of a float valve apparatus 10a according to the present embodiment, similarly to the above-mentioned embodiment, a support spring storage recess 45 into which a support spring 70 is to be inserted is formed in the central portion of the float valve 40. Further, a cylindrically-shaped press-fit projection 48 is formed to downwardly project from the central portion of the inner end portion (inner upper surface) of the support spring storage recess 45 with a given height and to have a larger outside diameter than the inside diameter of the support spring 70.

When the support spring 70 is pushed into the outer periphery of the press-fit projection 48 so that the support spring 70 covers the outer periphery of the portion 48, the press-fit projection 48 is press-fitted into the inner periphery of the support spring 70, and the upper end portion 70a of the support spring 70 is fixed to the inner end portion of the support spring storage recess 45, whereby the float valve 40 and support spring 70 are combined with each other.

According to the present embodiment, the press-fit projection 48 to be press-fitted into the support spring 70 is formed to have a cylindrical shape. However, the press-fit projection 48 may also be a pillar-shaped or tubular-shaped press-fit projection and may have a polygonal shape such as a square shape, a pentagonal shape and a hexagonal shape; a press-fit projection having a cross-shaped cross section; or a press-fit projection having plural plate-shaped ribs radially erected therefrom. According to the press-fit projection having the above shape, there can be provided the following advantage: when the press-fit projection 48 is pushed into the inner periphery of the support spring 70, the corner portions of the outer periphery of the press-fit projection are strongly pressure contacted with the inner periphery of the support spring 70 locally, and the upper end portion 70a of the support spring 70 is firmly fixed to the inner end portion of the support spring storage recess 45.

According to the present embodiment, the press-fit projection 48 is provided to project downwardly from the support spring storage recess 45, and the upper end portion 70a of the support spring 70 is fixed to the inner end portion of the support spring storage recess 45 by pressure inserting the press-fit projection 48 into the inner periphery of the support spring 70. However, this is not limitative as means for fixing the upper end portion 70a of the support spring 70 and the inner end portion of the support spring storage recess 45 to each other to thereby combine together the float valve 40 and support spring 70.

For example, the support spring 70 may be previously disposed in the inside of a metal mold for injection molding the float valve 40. In this case, the upper end portion 70a of the support spring 70 may be fixed to the inner end portion of the support spring storage recess 45 by insert molding the support spring 70, thereby combining the float valve 40 and the support spring 70 together.

For example, a recess may be previously formed to extend upwardly from the support spring storage recess 45 with a given depth and to have a smaller inside diameter than the outside diameter of the support spring 70. In this case, the upper end portion 70a of the support spring 70 and the inner end portion of the support spring storage recess 45 are fixed to each other by press-fitting the support spring 70 into the recess, thereby combining the float valve 40 and the support spring 70 together.

For example, the upper end portion 70a of the support spring 70 may be bonded to the inner end portion of the support spring storage recess 45 using fuel-resisting adhesive. The upper end portion 70a of the support spring 70 may be connected to the inner end portion of the support spring storage recess 45 by welding. A pillar-shaped or tubular-shaped projection may be provided to project from the inner end portion of the support spring storage recess 45; the projection may be inserted into the upper end portion 70a of the support spring 70; and the leading end outer periphery of the projection may be caulked by welding or the like, thereby fixing the upper end portion 70a of the support spring 70 to the inner end portion of the support spring storage recess 45.

According to the present embodiment, the free length of the support spring 70 is set smaller than the depth D (see FIG. 7) of the support spring storage recess 45. Further, in the central portion of the bottom portion of the lower cap 23, a projection 35a projecting upward is provided to have a slightly reduced diameter. This projection 35a is structured in the following manner: the outer periphery of the projection 35a slidingly contacts with the inner periphery of the support spring storage recess 45 when the float valve 40 rises and falls (see FIGS. 7 and 8), and the lower end portion 70b of the support spring 70 is contacted with the upper end portion of the projection 35a (see FIG. 7) when the float valve 40 falls.

Next, description will be given below of the operation of the float valve apparatus 10 having the above structure.

The rising and falling operations of the float valve 40 are similar to the embodiment shown in FIGS. 1 to 5. That is, as shown in FIG. 7, when the liquid surface of the fuel F is raised due to the supply of the fuel in a state where the float valve 40 is lowered, the fuel flows through a communication hole 38 into the lower space 26 and the float valve 40 is floated up; and the valve member 44 is contacted with the valve seat 27a to close the opening 27 when the liquid surface of the fuel F reaches the upper limit as shown in FIG. 8; and after then, the fuel supply is automatically stopped due to the increased internal pressure of the fuel tank, thereby performing the fill-up control.

In the float valve apparatus 10 according to the previously-described embodiment shown in FIGS. 1 to 5, the lower end portion 70b of the support spring 70 is supported by the projection 35 provided on the lower cap 23 (see FIGS. 3 and 4), and the support spring storage recess 45 is formed to have a sufficient inside diameter in order to prevent the support spring 70 from slidingly contact with the inner periphery of the support spring storage recess 45 when the support spring 70 is inclined due to the rising and falling operation of the float valve 40. If the support spring 70 slidingly contacts with the inner periphery of the support spring storage recess 45, the resistance against the rising and falling operation of the float valve 40 might be generated and the accurate operation of the float valve 40 might be affected.

On the other hand, in the float valve apparatus 10a according to the present embodiment, the upper end portion 70a of the support spring 70 is inserted into the support spring storage recess 45 formed in the central portion of the lower surface of the float valve 40, and the upper end portion 70a is fixed to the inner end portion of the support spring storage recess 45, thereby combining the float valve 40 and support spring 70 with each other. As a result, for example, as shown in FIG. 8, when the float valve 40 rises and falls, the support spring 70 rises and falls together with the float valve 40, and the support spring 70 is surely prevented from slidingly contacting with the inner periphery of the support spring storage recess 45. Therefore, the resistance against the rising and falling operation of the float valve 40 is surely prevented from being caused.

Also, according to the present embodiment, the support spring 70 is inserted into the support spring storage recess 45 formed to have a depth larger than the free length of the support spring 70, and the projection 35a provided on the bottom surface of the housing is inserted into the support spring storage recess 45, thereby surely preventing the mutual interference between the support spring 70 and the upward urging spring 60 disposed outside the support spring 70. Further, when the float valve 40 rises and falls, the projection 35a slidingly contacts with the inner periphery of the support spring storage recess 45 (see FIG. 8). As a result, the rising and falling operation of the float valve 40 is guided, and the inclination and de-centering of the float valve 40 is prevented, thereby allowing the float valve 40 to rise and fall smoothly.

According to an aspect of the present invention, there is provided the float valve apparatus in which the float valve is elastically received by the support spring even when the liquid surface of fuel varies suddenly to cause the float valve to move down. As a result, the lower surface of the float valve is prevented from colliding with the bottom surface of the housing, thereby reducing the hitting sounds of the float valve greatly.

Also, since the support spring is disposed inside the upward urging spring, the outside diameter of the support spring can be set smaller than the outside diameter of the upward urging spring, the spring load, spring free length and the like can be set with high accuracy, and a proper clearance is surely interposed between the lower surface of the float valve and the bottom surface of the housing, thereby reducing the hitting sounds of the float valve effectively.

Further, since the support spring is disposed inside the upward urging spring, even when the float valve lowers in an inclined manner, the float valve is supported stably and the lowering operation of the float valve is done smoothly.

What is claimed is:
1. A float valve apparatus comprising:
  a housing including:
    a partition wall that divides an internal space of the housing into a lower space and an upper space and that has an opening formed therein;
    a ventilation pipe that is formed to communicate the upper space with an outside;
    a valve seat that is formed at the opening of the partition wall; and
    a communication hole that is formed to communicate the lower space with the outside;
  a float valve that is disposed to be slidably movable in a vertical direction in the lower space and that is configured to be upwardly floated by liquid flowing into the lower space through the communication hole so as to open and close the opening;

an upward urging spring that is disposed between a lower surface of the float valve and a bottom surface of the housing to urge the float valve toward the opening; and, a support spring that is disposed inside the upward urging spring to support the float valve such that a bottom portion of the float valve is prevented from contacting the housing in a state where the float valve is moved to a lower-most position.

2. The float valve apparatus according to claim 1,
wherein the float valve includes:
   a support spring storage recess that is formed in a central portion of the lower surface of the float valve to store the support spring therein and comprises a depth larger than a free length of the support spring;
   an upward urging spring storage recess that is formed at an outer periphery of the support spring storage recess to store the upward urging spring; and
   a tubular partition wall that is formed to partition the support spring storage recess and the upward urging spring storage recess,
wherein the housing includes a projection that is formed to protrude from a central portion of the bottom surface of the housing and that supports a lower end portion of the support spring, and
wherein the support spring is inserted into the support spring storage recess so that the lower end portion thereof is supported by the projection.

3. A float valve apparatus comprising:
a housing including:
   a partition wall that divides an internal space of the housing into a lower space and an upper space and that has an opening formed therein;
   a ventilation pipe that is formed to communicate the upper space with, an outside:
   a valve seat that is formed at the opening of the partition wall; and
   a communication hole that is formed to communicate the lower space with the outside;
a float valve that is disposed to be slidably movable in a vertical direction in the lower space and that is configured to be upwardly floated by liquid flowing into the lower space through the communication hole so as to open and close the opening;
an upward urging spring that is disposed between a lower surface of the float valve and a bottom surface of the housing to urge the float valve toward the opening; and
a support spring that is disposed inside the upward urging spring to support the float valve so as to be prevented from contacting with the bottom surface of the housing in a state where the float valve is moved to a lower-most position,
wherein the float valve includes:
   a support spring storage recess that is formed in a central portion of the lower surface of the float valve to store the support spring therein and to have a depth larger than a free length of the support spring;
   an upward urging spring storage recess that is formed at an outer periphery of the support spring storage recess to store the upward urging spring; and
   a tubular partition wall that is formed to partition the support spring storage recess and the upward urging spring storage recess,
wherein the housing includes a projection that is formed to protrude from a central portion of the bottom surface of the housing and that supports a lower end portion of the support spring,
wherein the support spring is inserted into the support spring storage recess so that the lower end portion thereof is supported by the projection, and
wherein the projection includes:
   a support portion that is formed at a proximal side thereof to support the lower end portion of the support spring and that is to slidingly contact with an inner periphery of the support spring storage recess when the float valve moves vertically; and
   an insertion portion that upwardly extends from the support portion to have a diameter reduced with respect to the support portion and that is to be inserted into an inner periphery of the support spring.

4. The float valve apparatus according to claim 2, wherein at least part of the projection comprises a plurality of ribs radially projecting from, a center axis thereof.

5. The float valve apparatus according to claim 1,
wherein the float valve includes a support spring storage recess that is formed in a central portion of the lower surface of the float valve to store the support spring therein, and
wherein an upper end portion of the support spring is fixed to an inner end portion of the support spring storage recess.

6. The float valve apparatus according to claim 5,
wherein the support spring storage recess is formed to have a depth larger than a free length of the support spring,
wherein the housing includes a projection that is formed to protrude from a central portion of the bottom surface of the housing, and
wherein the projection slidingly contacts with an inner periphery of the support spring storage recess when the float valve moves vertically and contacts with a lower end portion of the support spring when the float valve moves downward.

7. The float valve apparatus according to claim 1, wherein the housing includes a projection, the projection including:
   a support portion formed at a proximal side thereof to support a lower end portion of the support spring; and
   an insertion portion that upwardly extends from the support portion so as to be inserted into an inner periphery of the support spring.

8. The float valve apparatus according to claim 1, wherein a distal end of a lower end portion of the upward urging spring is disposed lower than a distal end of a lower end portion of the support spring.

9. The float valve apparatus according to claim 1, wherein the bottom portion of the float valve comprises an axially distal end of the float valve.

10. The float valve apparatus according to claim 1, wherein the float valve includes a base portion and guide fins extending radially outward from the base portion.

11. The float valve apparatus according to claim 10, wherein the urging spring and the support spring are disposed radially inward of an outer radius of the base portion.

12. The float valve apparatus according to claim 2, wherein radially inner and radially outer surfaces of the tubular partition wall are bordered by the support spring and upward urging spring, respectively.

* * * * *